Patented Sept. 29, 1925.

1,555,517

UNITED STATES PATENT OFFICE.

SWIGEL POSTERNAK, OF CHENE-BOUGERIES, NEAR GENEVA, SWITZERLAND, ASSIGNOR TO THE SOCIETY OF CHEMICAL INDUSTRY IN BASLE, OF BASEL, SWITZERLAND.

CALCIUM SALT OF THE ORGANIC PHOSPHORUS COMPOUND CONTAINED IN MILK CASEIN AND PROCESS OF MAKING THE SAME.

No Drawing.    Application filed July 20, 1923.    Serial No. 652,851.

*To all whom it may concern:*

Be it known that I, SWIGEL POSTERNAK, a citizen of Switzerland, residing at Chene-Bougeries, near Geneva, in the Confederation of Switzerland, have invented a new and useful Calcium Salt of the Organic Phosphorus Compound Contained in Milk Casein and Processes of Making the Same, of which the following is a full, clear, and exact specification.

The only attempt to render available for technical use the organic phosphorus compound contained in milk casein is due to Salkowski (D. R. P. Kl. 30$^h$, 114,273) who after neutralizing a solution made by digestion of the casein with pepsin and hydrochloric acid evaporates it to one half, then mixes with a solution of iron ammonium sulfate (iron ammonium alum), and, finally, coagulates the mixture by heating. In this manner he obtains an iron compound which is insoluble in water, containing on an average 2.5 per cent of phosphorus and 22 per cent of iron.

By treatment with warm caustic soda solution the iron compound is freed from the iron, and then precipitated with copper acetate, the precipitate is freed from copper with hydrogen sulfide, and the solution thus obtained after appropriate concentration is precipitated by alcohol. The white precipitate contains 4.05 per cent of phosphorus and is supposed to represent the free organic phosphorus compound.

It is obvious that, if the latter compound constitutes the free acid of the original iron salt, it is to be supposed that this salt contains at least 25 per cent of foreign impurities. The production of a compound richer in phosphorus is complicated and connected with great losses.

It has now been found that preparations still richer in phosphorus than the aforesaid white precipitate can be obtained in a very simple manner by digesting the milk casein with trypsin in weak ammoniacal solution and separating the organic phosphorus compound from the solution in the form of a compound of an alkaline-earth metal and especially as a calcium compound soluble in water, which is excellently suitable for therapeutic utilization.

The process is based on the following observations. In weak ammoniacal solution the milk casein is split by trypsin in a very short time, so that the organic phosphorus compound in question is liberated.

The ammoniacal liquid produced by the trypsin digestion yields a precipitate neither with a salt of an alkaline-earth metal nor with one to two volumes of alcohol. If, however, there is added first a suitable quantity of a salt of alkaline-earth metals and then one volume of alcohol, a precipitate is obtained which consists, in greater part, of the organic phosphorus compound in the form of a compound of the alkaline-earth metal. The precipitate is soluble in water and can be purified by re-precipitation with one volume of alcohol.

Preliminary to the precipitation of the calcium salt the phosphorus compound may be purified by conversion into an insoluble heavy metal salt. For instance, the solution produced by the trypsin digestion, after separation from the solid matter by pressing, may be treated with lead acetate, the precipitate thus produced may be deprived of lead in a suitable manner, for instance by means of hydrogen sulfide, the acid filtrate neutralized with milk of lime and the calcium salt directly precipitated by alcohol or the filtrate may be neutralized with ammonia and the solution thus obtained treated, in the above described manner, to obtain the calcium salt.

The invention is illustrated by the following examples.

*Example 1.*

10 kilos of commercial milk casein are suspended in 80 liters of water previously warmed to 40° C. To this suspension there are added 1 liter of ammonia of 20 per cent strength, 20 grams of trypsin or 400 grams of finely divided fresh pancreas and 100 ccm. of toluene. The mixture is left to stand at 40° C., while continuously stirring, until the fatty acids formed from the fat contained in the casein separate in form of flocks which may easily be filtered. This stage of the process is usually attained in about 48 hours. The mass is left at rest in the cold for another 24 hours, after which there are added 500 grams of diatomaceous earth, while stirring, whereupon the mixture is filter-pressed. To the clear filtrate there is added a concentrated solution of 300 grams of calcium chloride or 430 grams of calcium acetate and 85 liters of alcohol. After two hours the precipitate is filtered, washed with dilute alcohol, dissolved in 2 liters of water and precipitated again with the same volume of alcohol. Finally the precipitate is washed with alcohol, filter-pressed, dried in the vacuum, and pulverized.

In this manner there are obtained about 1.25 kilos of a white powder easily soluble in water having an indifferent taste and containing 4.5 to 5 per cent of phosphorus, 10 to 11 per cent of calcium and about 11.5 per cent of nitrogen.

*Example 2.*

10 kilos of commercial milk casein are treated with ammonia and trypsin, as described in the preceding example, in 80 liters of water previously warmed to 40° C. After filter-pressing an aqueous solution of basic lead acetate is added to the liquid until no further precipitate is formed; an excess must, however, be avoided as thereby the precipitate would in part be re-dissolved. For the precipitation there are required about 5 liters of lead acetate. The lead precipitate is filtered, thoroughly washed with hot water, deprived of the lead by means of hydrogen sulfide, and liberated from the excess of the hydrogen sulfide by an air current. Then ammonia is added until the liquid is alkaline to phenolphthalein, whereupon the phosphorus compound is precipitated with 400 grams of a concentrated solution of calcium acetate and a volume of alcohol equal to that of the liquid. The precipitate is further worked up as indicated in the preceding example.

It may be remarked that, without altering the result in any way, the precipitation may also be effected with other salts of lead, for instance, sugar of lead in presence of an excess of ammonia, or with salts of other heavy metals, such as mercuric chloride. Further the precipitate may be partly freed from the lead by sulphuric acid of 10 per cent strength instead of by hydrogen sulfide.

What I claim is:

1. The herein described process for the manufacture of the calcium salt of the organic phosphorus compound contained in milk casein, by digesting the casein according to usual methods, with trypsin in a weak ammoniacal solution until separation of the fatty acids, originating from the fat of the casein, occurs, precipitating the filtered digestion liquid with a soluble calcium salt and about one volume of alcohol, redissolving the precipitate of the calcium salt of the phosphorus compound thus obtained in water, reprecipitating the solution with alcohol, and drying the product thus purified.

2. The herein described process for the manufacture of the calcium salt of the organic phosphorus compound contained in milk casein, by precipitating the solution resulting from the trypsin digestion of casein with soluble calcium salts and alcohol.

3. The herein described process for the manufacture of the calcium salt of the organic phosphorus compound contained in milk casein, by precipitating the solution resulting from the trypsin digestion of casein with soluble calcium salts and alcohol, redissolving the precipitate thus formed in water, and reprecipitating the solution with alcohol.

4. As new product the herein described calcium salt of the organic phosphorus compound contained in milk casein, constituting a white powder of indifferent taste easily soluble in water and containing 4.5 to 5 per cent of phosphorus, 10 to 11 per cent of calcium, and about 11.5 per cent of nitrogen.

In witness whereof I have hereunto signed my name this 5th day of July 1923.

SWIGEL POSTERNAK.